US008460772B1

(12) United States Patent
Huddleston et al.

(10) Patent No.: US 8,460,772 B1
(45) Date of Patent: Jun. 11, 2013

(54) ADJUSTABLE SCORED PANELS

(75) Inventors: Charles Huddleston, Orlando, FL (US); Desmond Depass, Fort Lauderdale, FL (US)

(73) Assignee: Cato 2007, Inc., Orlando, FL (US)

( * ) Notice: Subject to any disclaimer, the term of this patent is extended or adjusted under 35 U.S.C. 154(b) by 298 days.

(21) Appl. No.: 12/910,143

(22) Filed: Oct. 22, 2010

(51) Int. Cl.
*B32B 3/30* (2006.01)

(52) U.S. Cl.
USPC ............................................ 428/43; 428/156

(58) Field of Classification Search
CPC ........................................................ B32B 3/30
USPC ..................................... 428/43, 156; 169/51
See application file for complete search history.

(56) References Cited

U.S. PATENT DOCUMENTS 5,638,906 A 6/1997 McCabe
5,833,006 A 11/1998 McCabe
2010/0075093 A1* 3/2010 Gifford et al. .................. 428/43

OTHER PUBLICATIONS

CATO: Leader in Fire Safety, website, retrieved on Aug. 5, 2010, retrieved from http://www.cato2007.com/.
Potter Roemer, Fire Pro, website, retrieved on Aug. 5, 2010, retrieved from http://www.potterroemer.com/component/page,shop.product_details/flypage,shop.flypage/p . . . .

* cited by examiner

*Primary Examiner* — Alexander Thomas
(74) *Attorney, Agent, or Firm* — Brian S. Steinberger; Law Offices of Brian S. Steinberger, P.A.

(57) ABSTRACT

Break away panels, devices and methods of using the break-away panels with grid scored patterns for fire extinguisher cabinets which can be made for small, mid-size and large size fire extinguisher cabinets, and easily resized when needed. Three novel panels each having novel vertical and horizontal scored lines running throughout the panels and be located on the inside surface of the installed panels. An installer can easily break off upper and/or lower and/or side edges of the panels in order to resize the panel to fit almost any size fire extinguisher cabinet. The scoring lines can be accomplished by a router. Alternatively, the entire panel and the scored lines can be formed from injection molding.

12 Claims, 17 Drawing Sheets

ADJUSTABLE SCORED PANELS

This invention relates to fire extinguishers, and in particular to break away panels, devices and methods of using the breakaway panels with a grid scored patterns for fire extinguisher cabinets, with the scored lines formed from routing and injection molding.

BACKGROUND AND PRIOR ART

Wall mounted fire extinguisher cabinets have been around for many years and are often required in commercial establishments such as office buildings and schools where a wall mounted cabinet has a front glass panel covering a fire extinguisher. The glass is intended to deter unnecessary uses of the fire extinguisher and also allow a viewing window so that one can see the fire extinguisher in the cabinet. In case of a fire, persons are instructed to break the glass exposing the fire extinguisher so that the fire extinguisher can be removed. See for example, U.S. Pat. No. 5,638,906 to McCabe. However, there are known problems with such cabinets.

Currently, in the fire extinguisher industry, there are somewhere in the neighborhood of 20 different cabinets, most of which have regular glass break panels in them. Fire extinguisher service technicians have a few options (all not so great) in regards to replacing broken break panels. They can carry large panes of uncut glass and cut the glass to fit each cabinet, but this is dangerous because they frequently injure themselves and they have lots of glass scrap leftover so that is not an efficient use of the glass. Some carry pre-cut glass of the most common sizes but this is a problem because they frequently are serving a property (especially an older property) with several different cabinets from different manufacturers that has old, outdated cabinets that they don't have glass that fits. So they usually have to measure the ones they need and come back which is a very inefficient use of their time.

Another option would be for the service technicians to carry about fifteen or more different sizes of panels made by the manufacturers of each cabinet (some are glass, some are acrylic) but this does not work. When there are 10 or 20 technicians with that many trucks, one would need a huge inventory to supply all those needs. So this option is impractical and never used).

Glass panels are becoming obsolete in view of other problems. Breaking the glass can require the user to have to insert their hand(s) through broken glass fragments left in the cabinet which can cut and harm the user. Sometimes the user will have to manually remove the loose and jagged glass pieces with their fingers which further increases the chances of causing harm to the user.

Since most jurisdictions require their commercially installed fire extinguisher cabinets must be inspected every year and recertified, installers have to remount new glass into the cabinets. This can be difficult and often causes the serviceman installer to take measurements of the cabinet on a first trip and have to make a return trip to the location at a different time and place, causing further delay and expense.

Attempts have been made over the years to come up with alternatives to plate, glass such as attempting to use safety type glass which when struck immediately disintegrates into very small pieces. See for example, U.S. Pat. No. 5,833,006 to McCabe. However, there are also problems with using this type of safety glass.

One problem is that safety glass can often cost substantially more than plate glass. Also, there are different sizes to the types of fire extinguisher cabinets that are being used, so that one size piece of safety glass cannot fit all the different sizes of fire extinguisher cabinets.

Additionally, safety glass cannot be resized, since cutting into any edge or side can easily weaken and cause the entire panel to break down.

The installer will often not be able to install the safety glass in different sized cabinets. Again this can be difficult since the installer will only be able take measurements of the cabinet on a first trip and have to make a return trip to the location at a different time and place to install a new panel, causing further delay and expense Attempts have been made to use some type of plastic panel with a limited number of grid scored sections such as large wide rectangle patterns, where the panel limited to being used in only a one size cabinet. These panels cannot be resized to fit more than one size of cabinet in view of their one size application. Also, these prior art scored panels can be difficult to break since there are few pieces that are actually scored in place.

These prior art scored panels can be further problematic when the installer is a serviceman for a fire extinguisher company must make individual field trips to diversely located destinations where the fire extinguisher cabinets need to be recertified for use. A single size prior art scored panel cannot fit the many different sized cabinets in the market. The serviceman installer will often have to make a return trip to get the right size panel of the job which increase the time to recertify the cabinets and results in higher labor costs, and related transportation costs for having to return to the same location at a different time. Since the single grid size panel is not used for many applications, the installer will usually switch to plate glass or safety glass which has additional problems.

Thus, the need exists for solutions to the above problems with the prior art.

SUMMARY OF THE INVENTION

A primary objective of the present invention is to provide break away panels, devices and methods of using the breakaway panels with grid scored patterns for fire extinguisher cabinets, which can be made for small, mid-size and large size fire extinguisher cabinets.

A secondary objective of the present invention is to provide break away panels, devices and methods of using the breakaway panels with grid scored patterns for fire extinguisher cabinets which can be easily resized onsite for different sized cabinets.

A third objective of the present invention is to provide break away panels, devices and methods of using the breakaway panels with grid scored patterns for fire extinguisher cabinets, which are inexpensive to replace when reactivating the fire extinguisher cabinet for future use.

A fourth objective of the present invention is to provide break away panels, devices and methods of using the breakaway panels with grid scored patterns for fire extinguisher cabinets, which allows installers to make one trip to both inspect and replace missing panels when the fire extinguisher cabinets are being recertified saving time and labor costs.

A fifth objective of the present invention is to provide break away panels, devices and methods of using the breakaway panels with grid scored patterns for fire extinguisher cabinets, which have scored patterns formed by a router.

A sixth objective of the present invention is to provide break away panels, devices and methods of using the breakaway panels with grid scored patterns for fire extinguisher cabinets, which have scored patterns with the entire panel formed from injection molding.

With the subject invention each technician will only need to keep a supply of three different panels that will fit virtually all of the extinguisher cabinets he services.

Better yet, he only has to snap off the pre-scored pieces to achieve his desired dimensions. No glass to cut himself on, no having to return wasting valuable time, no huge inventory needed. The subject invention also is useful in fire extinguisher cabinets by the assignee of the subject invention, Cato Inc. It is very difficult for a technician to cut glass panels for one of the Cato cabinets because of the rounded corners on them (large radii).

Although the technician can break most of the scored pieces off just using his fingers, the installer can use a pair of welders pliers or long needle-nose pliers to break them because it makes it extremely easy.

The public is much safer having to break a plastic panel than a glass one. Thus, replacing old glass panels with the subject invention will substantially reduce and eliminate the higher risk of injury that occurs with using glass panels.

The novel panels are 0.080 (inch) thickness acrylic and are being scored by CNC router to a depth of 0.045 (inch).

A novel method of modifying panels for different sized fire extinguisher cabinets, can include the steps of: providing a fire extinguisher cabinet having an opening on at least one side, the opening having a selected width and height, providing a translucent plastic panel, providing a plurality of vertical scored lines running from a top of the panel to a bottom of the panel forming vertical columns, providing a plurality of horizontal scored lines from a left side of the panel to a right side of the panel forming horizontal rows, and resizing the panel onsite by breaking away at least one of the vertical columns or at least one of the horizontal rows, to fit the opening in the fire extinguisher cabinet.

The step of resizing can include breaking away at least one column from the left side of the panel along at least one scored line.

The step of resizing can include breaking away at least one column from the right side of the panel along at least one scored line.

The step of resizing can include breaking away at least one row from the lower edge from the panel along at least one scored line.

The step of resizing can include breaking away at least one row from the upper edge from the panel along at least one scored line.

The step of resizing step can include breaking away at least one column from the left side of the panel along at least one scored line, along with breaking away at least one column from the right side of the panel along at least one scored line.

The step of resizing step can include breaking away at least one row from the lower edge from the panel along at least one scored line, along with breaking away at least one row from the upper edge from the panel along at least one scored line.

The step of resizing can include breaking away at least one column from the left side of the panel along at least one scored line, along with breaking away at least one column from the right side of the panel along at least one scored line.

The step of resizing step can include breaking away at least one row from the lower edge from the panel along at least one scored line, breaking away at least one row from the upper edge from the panel along at least one scored line, along with breaking away at least one column from the left side of the panel along at least one scored line, and breaking away at least one column from the right side of the panel along at least one scored line.

The novel panels can have a thickness of approximately 0.080 inches and each of the scored lines having a depth of approximately 0.045 inches.

A break away panel for fire extinguisher cabinets, can include a planar panel having a single vertical row of large width scored sections down the middle of the panel between an upper edge and a lower edge, and a plurality of narrow width scored sections running down a left side and a plurality of narrow width scored sections running down a right side, wherein the large width sections are substantially larger in width than the narrow width sections, wherein the panel is used for fire extinguisher cabinets.

The panel can have a thickness of approximately 0.080 inches and the scored sections each have a depth of approximately 0.045 inches.

A large panel can have dimensions of approximately 27.69 inches high by approximately 10.63 inches wide. The large panel can include four large rows each having scored lines approximately 6.92 inches from one another, with the top and bottom rows, each having a plurality of scored lines, and the panel has three vertical columns of sections, each being approximately 3.55 inches in width, the left and right vertical columns each having a plurality of additional scored lines.

A mid-size panel can have dimensions of approximately 22.63 inches high by approximately 8.63 inches wide. The mid-size panel can include four large rows each having scored lines approximately 5.66 inches from one another, with the top and bottom rows, each having a plurality of scored lines, and the panel has three vertical columns of sections, each being approximately 2.88 inches in width, the left and right vertical columns each having a plurality of additional scored lines.

A small panel can have dimensions of approximately 18.69 inches high by approximately 7.63 inches wide. The small panel can include four large rows each having scored lines approximately 4.82 inches from one another, with the top and bottom rows, each having a plurality of scored lines, and the panel has three vertical columns of sections, each being approximately 2.53 inches in width, the left and right vertical columns each having a plurality of additional scored lines.

Further objects and advantages of this invention will be apparent from the following detailed description of the presently preferred embodiments which are illustrated schematically in the accompanying drawings.

DESCRIPTION OF THE PREFERRED EMBODIMENTS

Before explaining the disclosed embodiments of the present invention in detail it is to be understood that the invention is not limited in its applications to the details of the particular arrangements shown since the invention is capable of other embodiments. Also, the terminology used herein is for the purpose of description and not of limitation.

A list of components will now be described.

10. Large panel.
20. Mid-sized panel.
30. Small panel.
40. Routed scores in panel.
50. Large cabinet.
60. Mid-sized cabinet.
70. Small cabinet.
80. "Strike on scores" label.
90. Striking tool.
100. Shattered panel pieces.
110. Fire extinguisher.
120. Pliers.
130. Resized panel.
140. Broken off pieces of panel after resizing.

The novel panels can be formed from a translucent acrylic plastic panel such as Plaskolite® by the Plaskolite, Inc. CORPORATION of Columbus, Ohio. The panels can have a plurality of vertical and horizontal scored routed lines, each having score lines. A preferred embodiment of the panel can have a thickness of approximately 0.080 inches, and each of the scored lines can have a depth of approximately 0.045 inches. Each routed score can have a convex round shape with a radius of 0.10 inches. The scored lines are on the inside of the panels.

Large Break Away Panel

Figure 1:
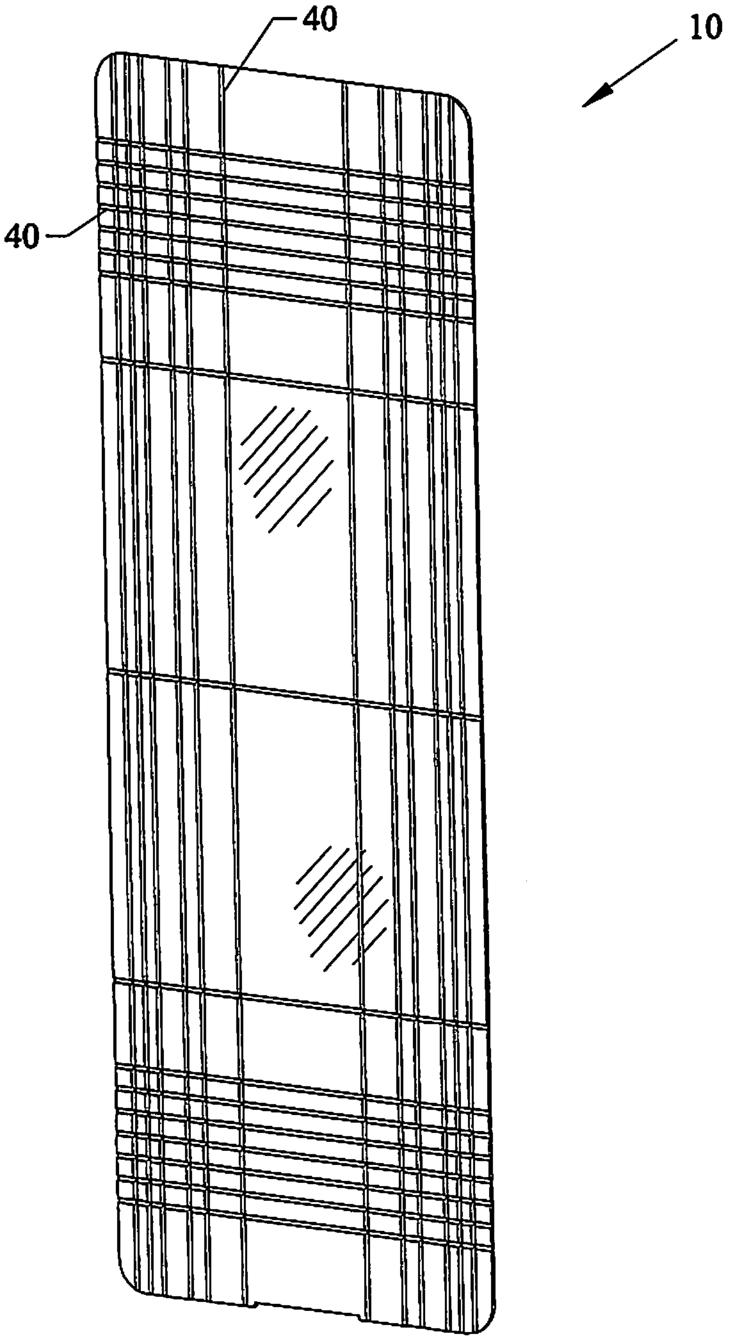
FIG. 1 shows a perspective front view of a large breakaway panel of the invention.
Figures 2, 2A:
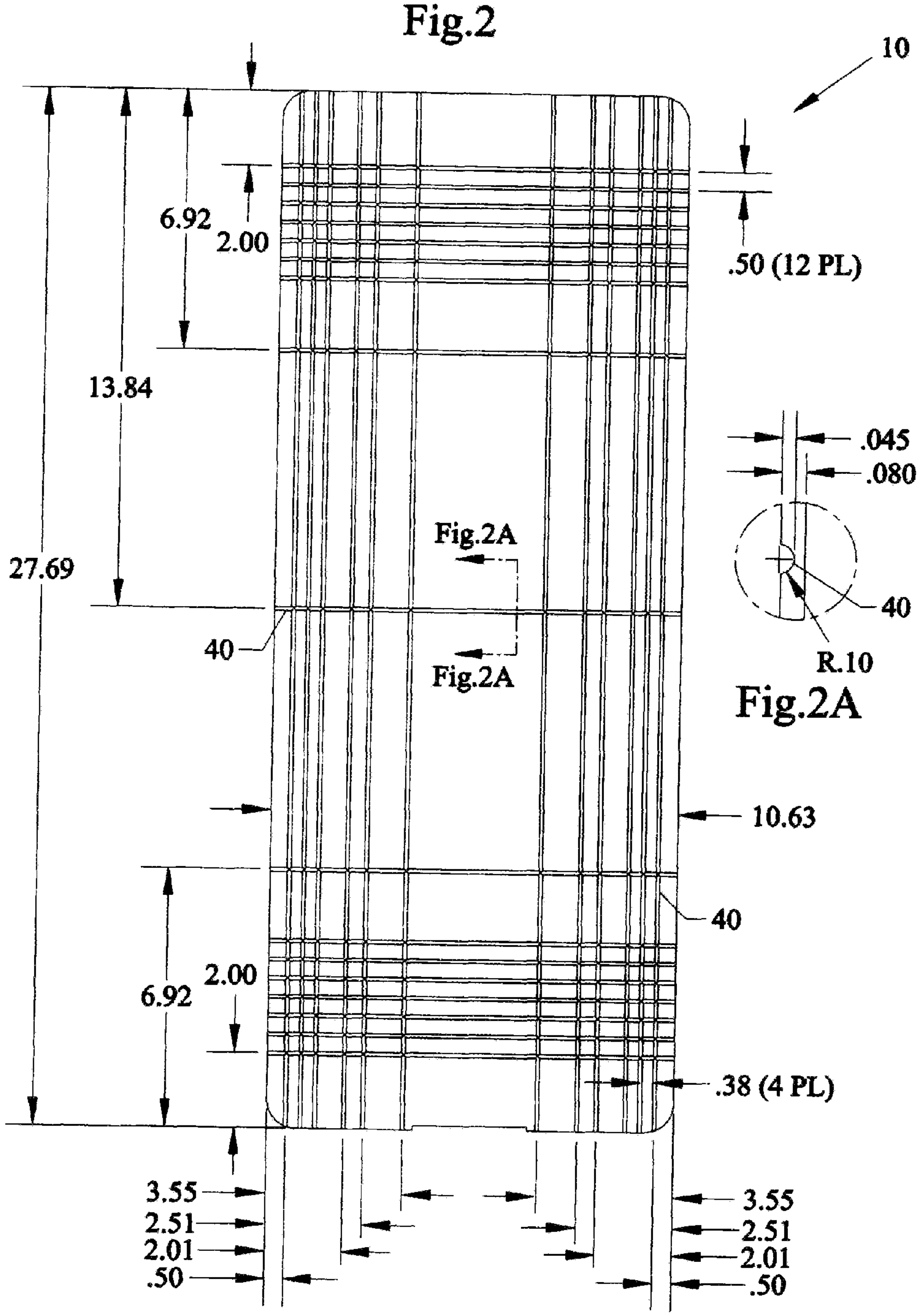
FIG. 2 is an inside planar rear view of the large panel of FIG. 1.
FIG. 2A is an enlarged cross-sectional view
Figure 3:
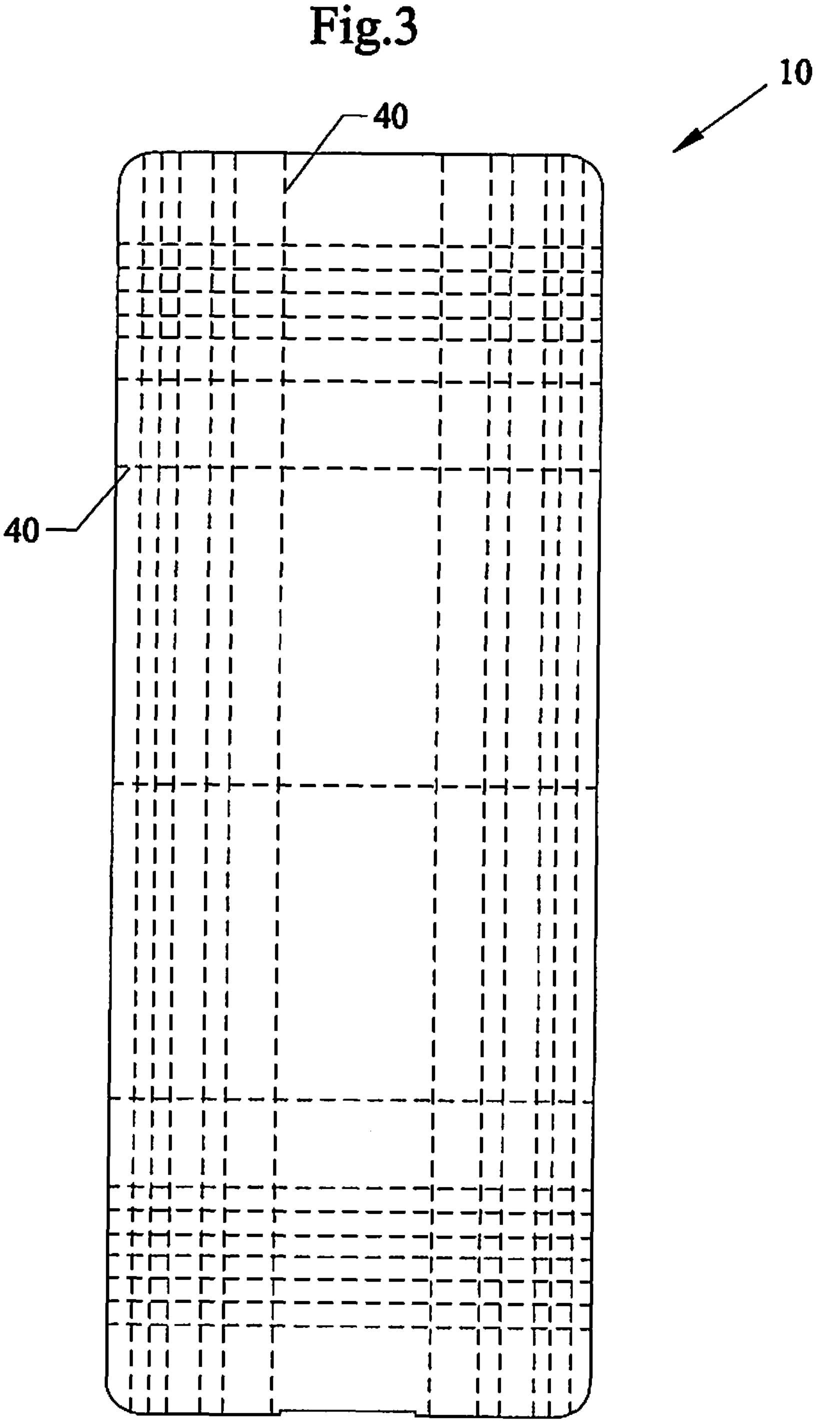
FIG. 3 is an outside planar front view of the large panel of FIG. 1.

FIG. 1 shows a perspective front view of a large breakaway panel 10 of the invention. FIG. 2 is an inside planar rear view of the large panel 10 of FIG. 1. FIG. 2A is an enlarged cross-sectional view. FIG. 3 is an outside planar front view of the large panel of FIG. 1.

Referring to FIGS. 1, 2 and 2A, the novel large breakaway panel 10, can have an overall height of approximately 27.69 inches and an overall width of approximately 10.63 inches.

The panel 10 can have a plurality of vertical parallel scored lines (routed scores) 40, and a plurality of horizontal scored lines (routed scores) 40.

The vertical columns can include a middle column having a width of 3.55 inches.

The novel panel 10 can have four large row sections, each having a height of approximately 6.92 inches. The top and bottom large row sections can each have seven additional scored lines that are each approximately 0.50 inches from each other, with each of the outer scored lines being approximately 2 inches from the upper and lower edges of the panel 10. The two middle large row sections having no additional scored lines therein.

The novel panel 10 can have three large width vertical columns each having a width of approximately 3.55 inches. The left most vertical column and the right most vertical column each have additional five scored lines. The outer first scored line is approximately 0.50 inches from the left and right side edges. The next two scored lines (2nd and 3rd) are spaced apart from one another approximately 0.38 inches. The fourth scored line is approximately 2.01 inches from the left and right side edges, and the fifth scored line being approximately 2.51 inches from the left and right side edges. The middle large vertical column has no additional scored lines.

The outer four corners of the panel 10 can be convex rounded.

Mid Size Break Away Panel

Figure 4:
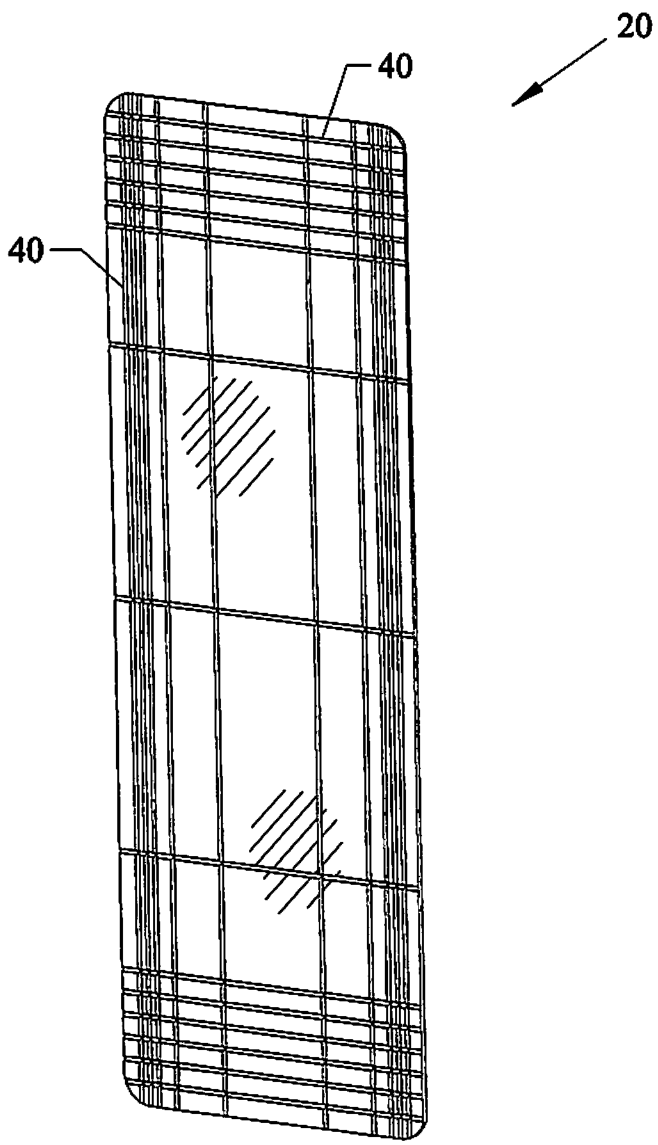
FIG. 4 is an inside perspective rear view of a mid-size break away panel.
Figure 5:
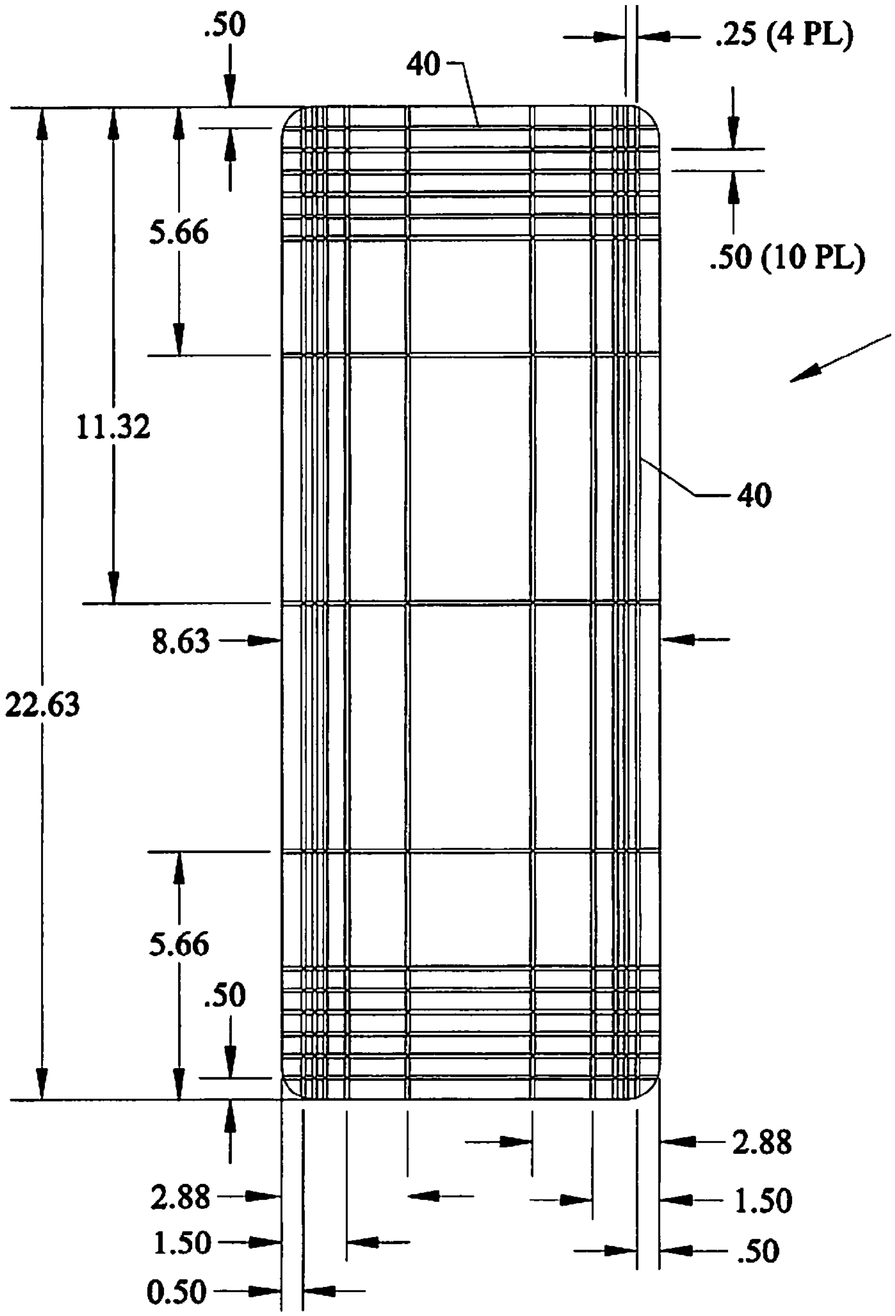
FIG. 5 is an inside planar view of the mid-size panel of FIG. 4.
Figure 6:
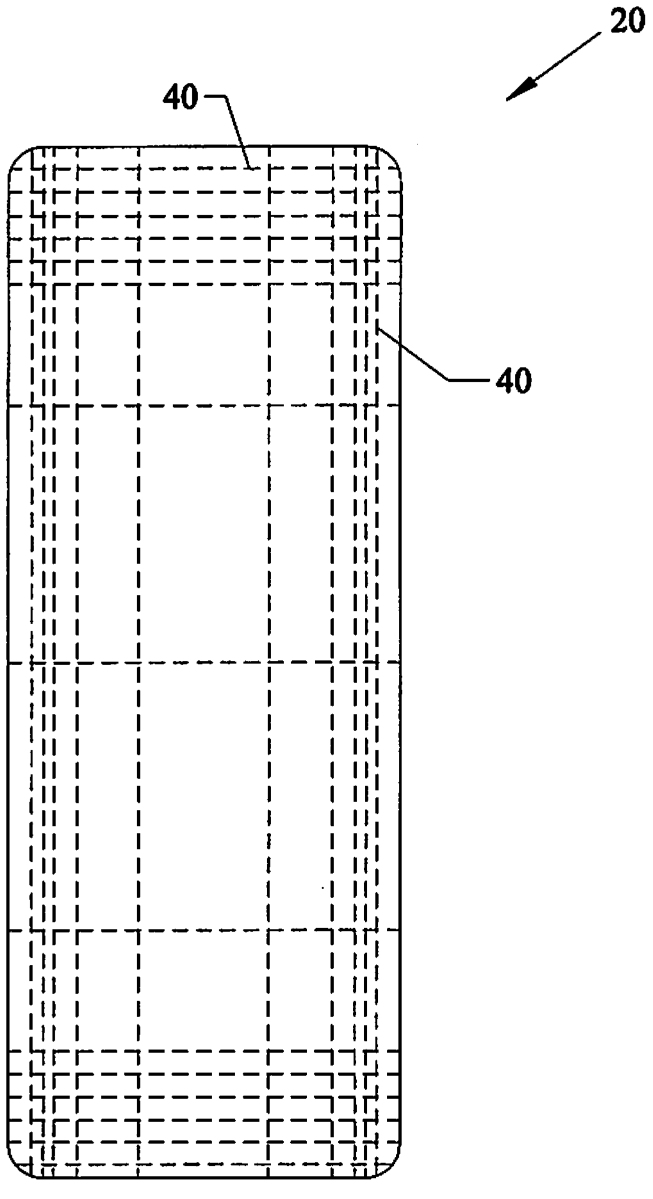
FIG. 6 is an outside planar front view of the mid-size panel of FIG. 4.

FIG. 4 is an inside perspective rear view of a mid-size break away panel 20. FIG. 5 is an inside planar view of the mid-size panel 20 of FIG. 4. FIG. 6 is an outside planar front view of the mid-size panel 40 of FIG. 4.

Referring to FIGS. 4-6, the mid size panel 20 can have an overall height of approximately 22.63 inches and an overall width of approximately 8.63 inches.

The panel 20 can have a plurality of vertical parallel scored lines (routed scores) 40, and a plurality of horizontal scored lines (routed scores) 40.

The vertical columns can include a middle column having a width of 2.88 inches.

The novel panel 20 can have four large row sections, each having a height of approximately 5.66 inches. The top and bottom large row sections can each have six additional scored lines that are each approximately 0.25 inches from each other, with each of the outer scored lines being approximately 0.50 inches from the upper and lower edges of the panel 20. The two middle large row sections have no additional scored lines therein.

The novel panel 20 can have three large width vertical columns each having a width of approximately 2.88 inches. The left most vertical column and the right most vertical column each have additional four scored lines. The outer first scored line is approximately 0.50 inches from the left and right side edges. The next two scored lines (2nd and 3rd) are spaced apart from one another approximately 0.25 inches. The fourth scored line is approximately 1.50 inches from the left and right side edges. The middle large vertical column has no additional scored lines.

The outer four corners of the panel 20 can be convex rounded.

Small Break Away Panel

Figure 7:
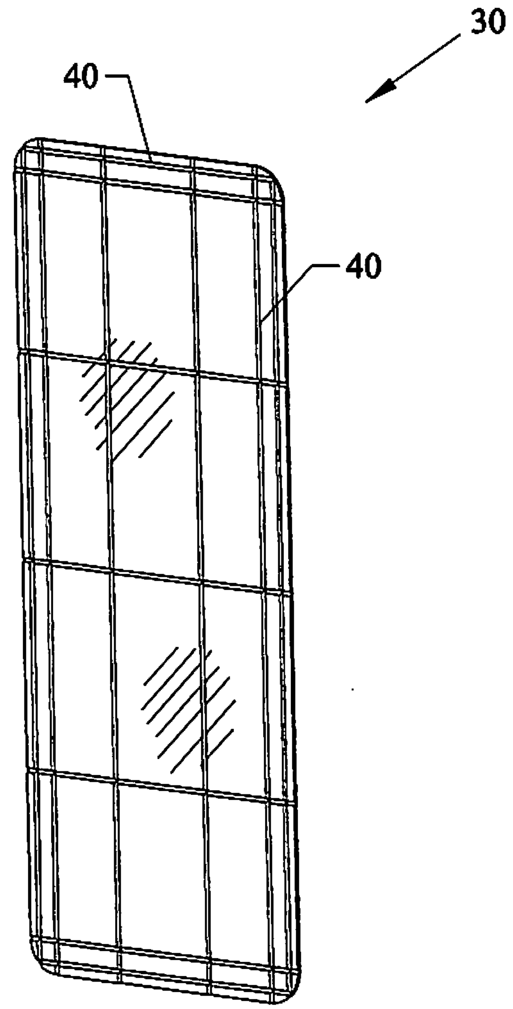
FIG. 7 is an inside perspective rear view of a small break away panel.
Figure 8:
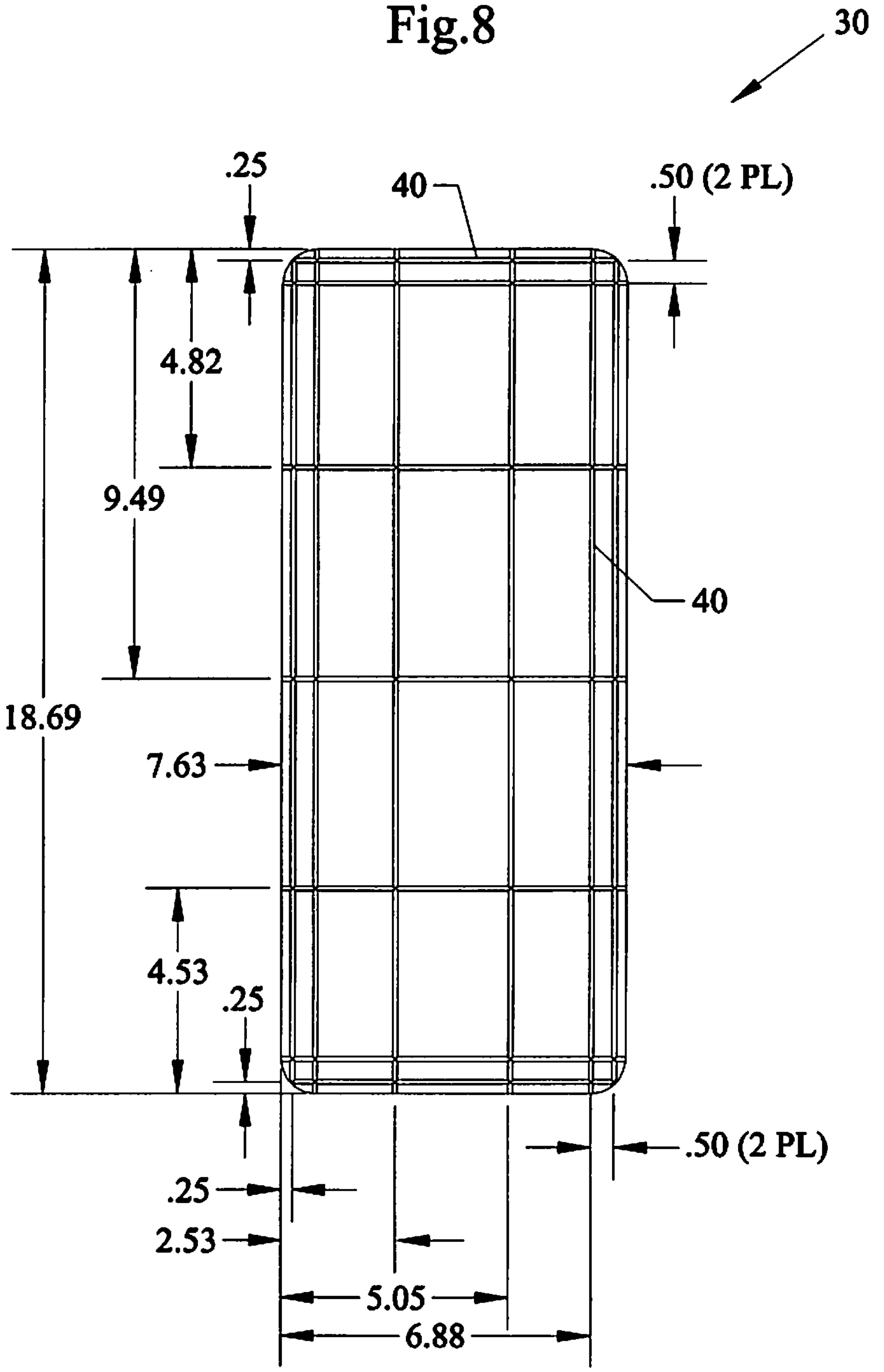
FIG. 8 is an inside planar rear view of the small panel of FIG. 7.
Figure 9:
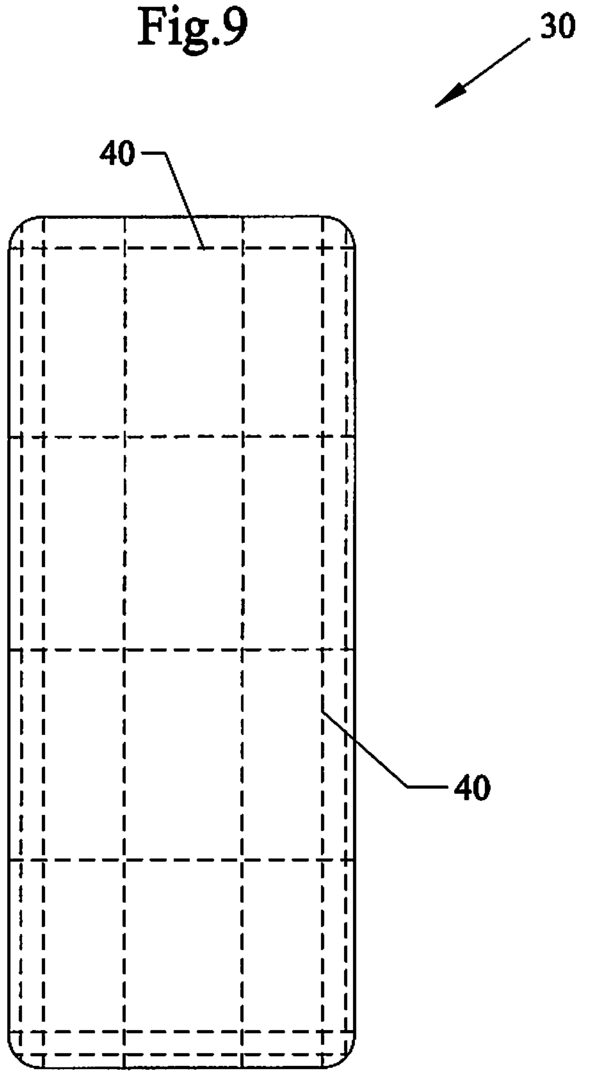
FIG. 9 is an outside planar front view of the small panel of FIG. 7.

FIG. 7 is an inside perspective rear view of a small break away panel 30. FIG. 8 is an inside planar rear view of the small panel 30 of FIG. 7. FIG. 9 is an outside planar front view of the small panel 30 of FIG. 7.

Referring to FIGS. 7-9, the small panel 30 can have an overall height of approximately 18.69 inches and an overall width of approximately 7.63 inches.

The panel 30 can have a plurality of vertical parallel scored lines (routed scores) 40, and a plurality of horizontal scored lines (routed scores) 40.

The vertical columns can include a middle column having a width of 2.53 inches.

The novel panel 30 can have four large row sections, each having a height of approximately 4.82 inches. The top and bottom large row sections can each have two additional scored lines that are each approximately 0.50 inches from each other, with each of the outer scored lines being approximately 0.25 inches from the upper and lower edges of the panel 30. The two middle large row sections have no additional scored lines therein.

The novel panel 30 can have three large width vertical columns each having a width of approximately 2.53 inches. The left most vertical column and the right most vertical column each have an additional two scored lines. The outer first scored line is approximately 0.25 inches from the left and right side edges. The next scored line is spaced inwardly another 0.50 inches. The middle large vertical column has no additional scored lines.

The outer four corners of the panel 30 can be convex rounded.

Figure 10:
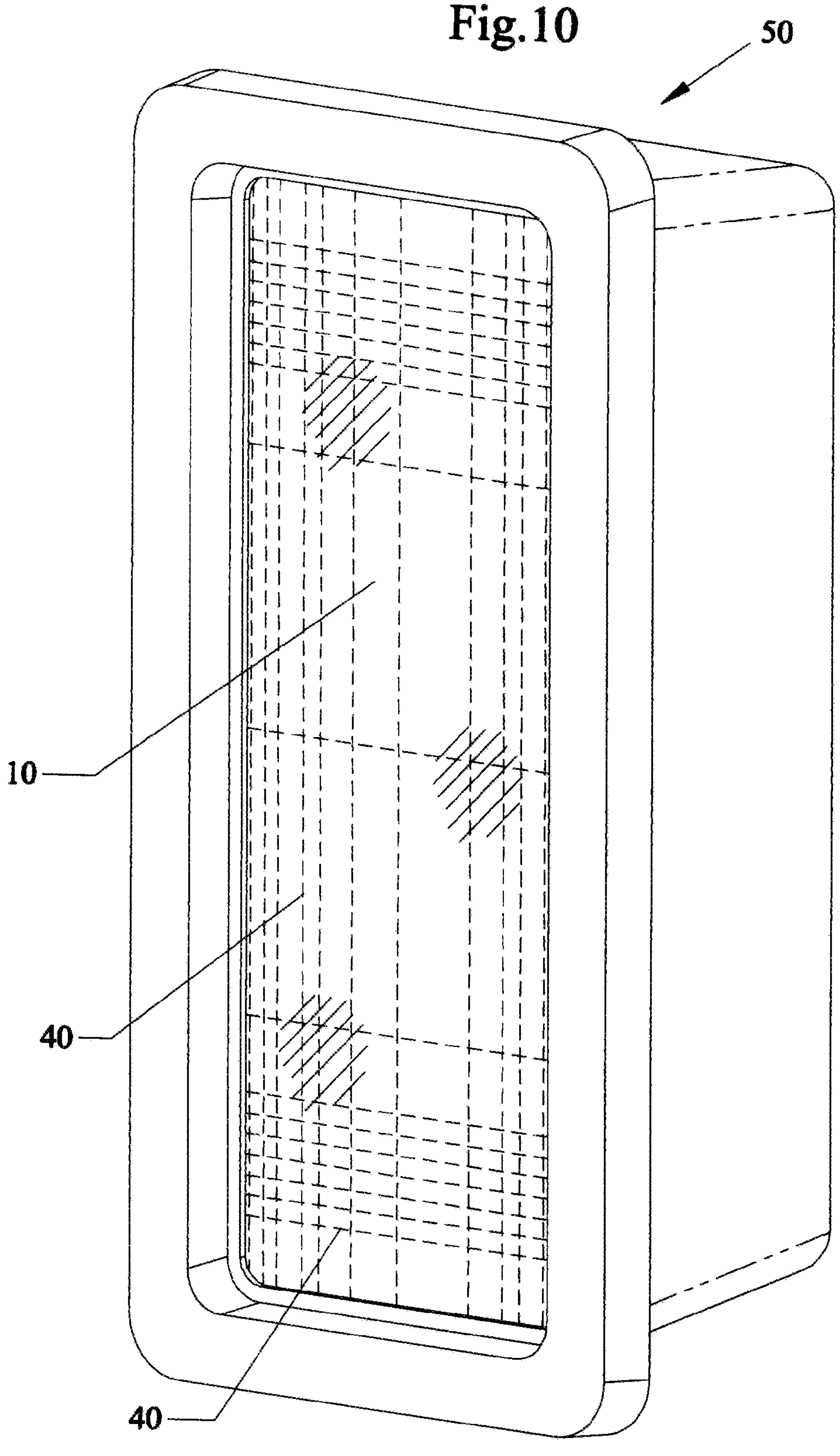
FIG. 10 is a front perspective view of large prior art cabinet with the novel large panel of FIGS. 1-3 installed.

FIG. 10 is a front perspective view of large prior art cabinet 50 with the novel large panel 10 with routed vertical and horizontal scored lines 40 of FIGS. 1-3 installed. The scored lines 40 are on the inside of the panels.

Figure 11:
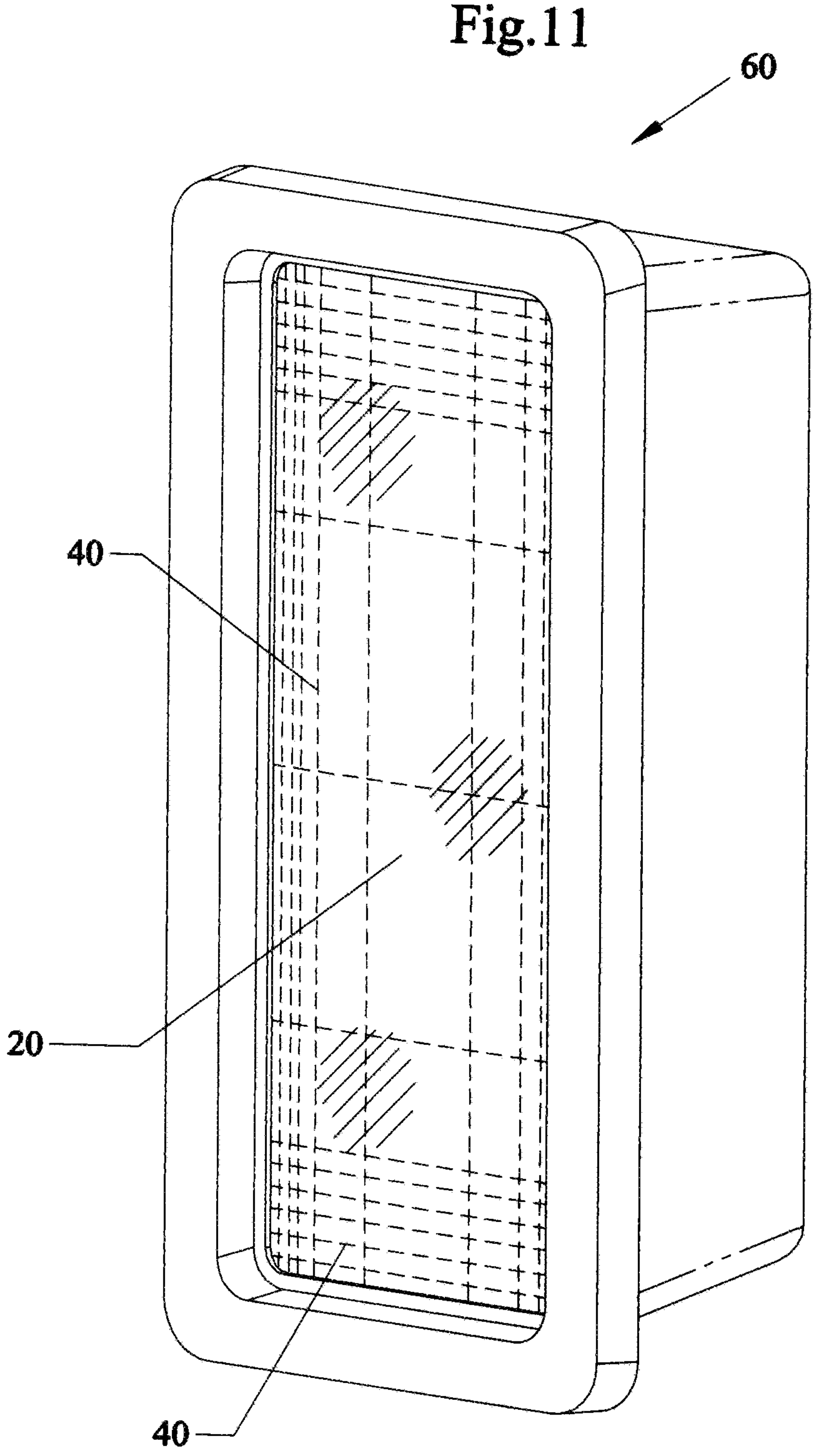
FIG. 11 is a front perspective view of a mid-size prior art cabinet with the novel mid-size panel of FIGS. 4-6 installed.

FIG. 11 is a front perspective view of a mid-size prior art cabinet 60 with the novel mid-size panel 20 with routed vertical and horizontal scored lines 40 of FIGS. 4-6 installed. The scored lines 40 are on the inside of the panels.

Figure 12:
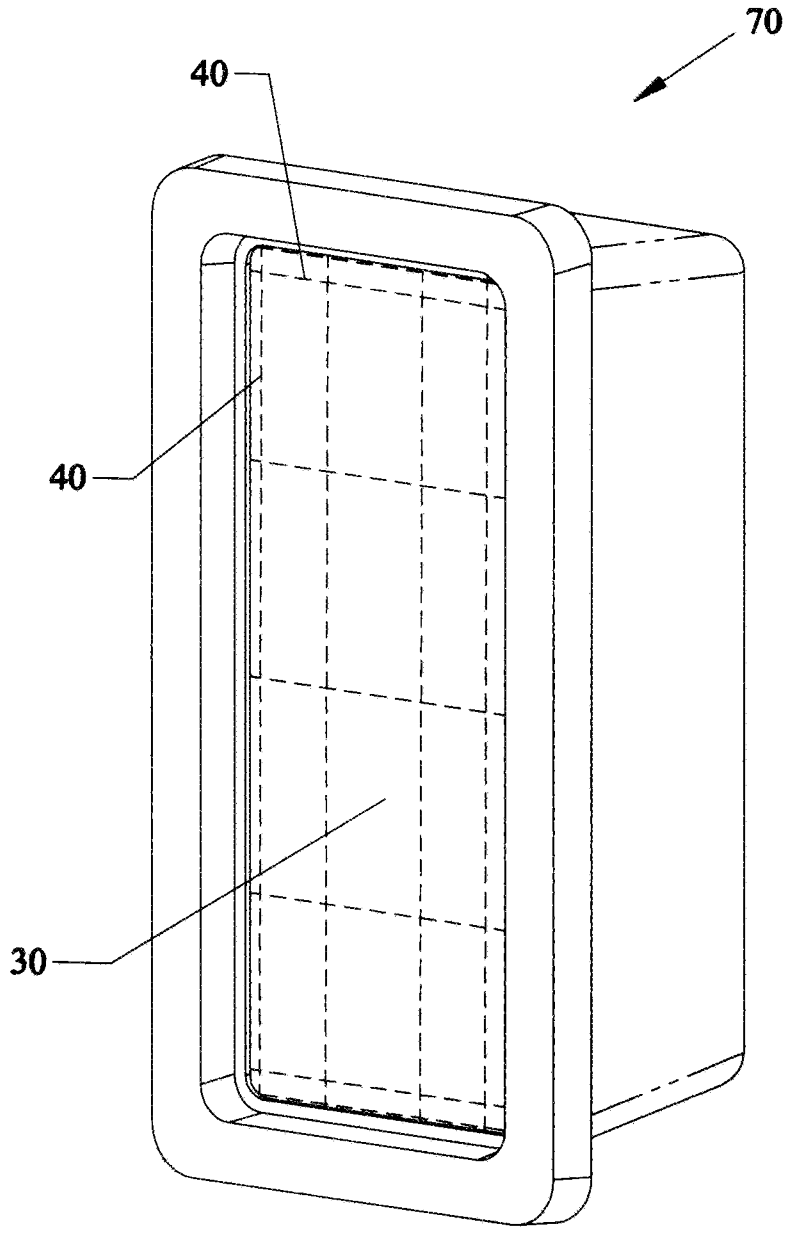
FIG. 12 is a front perspective view of small prior art cabinet with the small panel of FIGS. 7-9 installed.

FIG. 12 is a front perspective view of small prior art cabinet 70 with the small panel 30 with routed vertical and horizontal scored lines 40 of FIGS. 7-9 installed. The scored lines 40 are on the inside of the panels.

Figure 13:
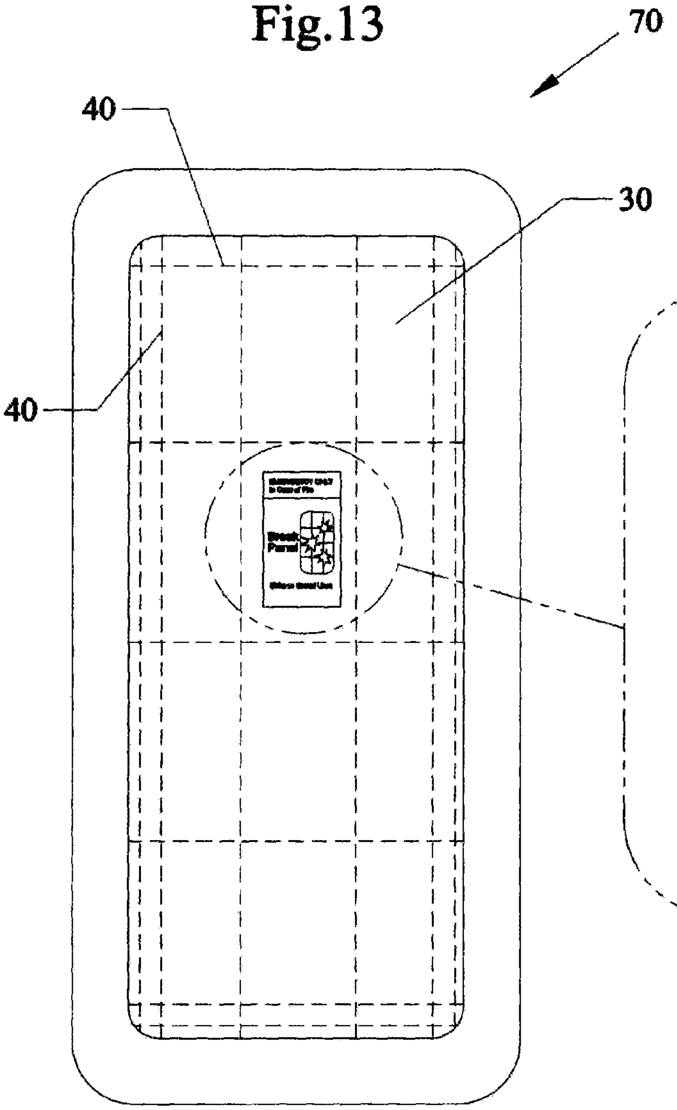
FIG. 13 is a front view of the small prior art cabinet with small panel installed of FIG. 12 and "break panel" label applied to panel.
Figure 13A:
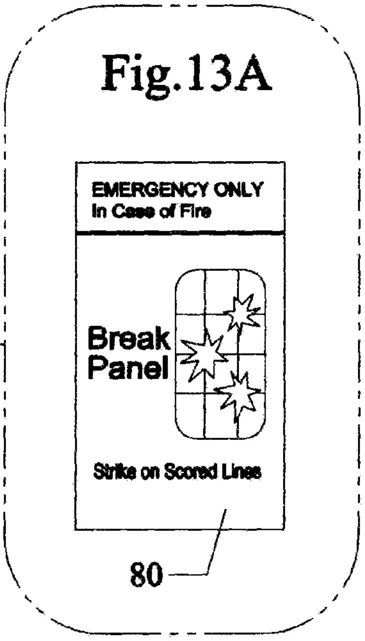
FIG. 13A is an enlarged view of the "break panel" label of FIG. 13.

FIG. 13 is a front view of the small prior art cabinet 70 with the novel small panel 30 with routed vertical and horizontal scored lines 40 installed of FIG. 12 and "break panel" label 80 applied to panel. FIG. 13A is an enlarged view of the "break panel" label of FIG. 13.

Referring to FIGS. 13 and 13A, the label 80 must be located on an entire rectangular section and cannot overlay a scored line. The label 80 indicates that the user is directed break the panel 30 by striking an area directly on one of the scored lines 40. It is easier to break the panel 30 in areas where the fire extinguisher is not located.

Figure 14:
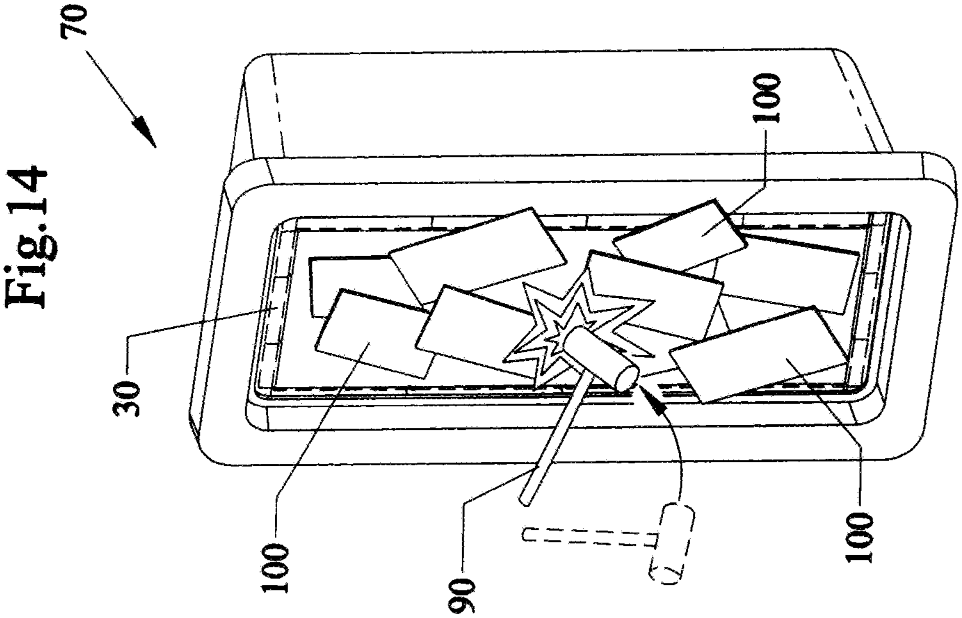
FIG. 14 is a perspective view of the small cabinet with installed small panel of FIG. 12, with a striking tool striking the panel into break away parts.

FIG. 14 is a perspective view of the small cabinet 70 with installed novel small panel 30 of FIG. 12, with a striking tool 90 striking the panel 30 into break away parts. Although a hammer 90 is shown, the striking device can be a small rod, or can be fist of the user. The user can strike the panel 30 along one of the scored lines to gain access to the fire extinguisher. The breakaway sections 100 are easy to remove since the scored lines 40 are on the inside of the panel 30 so that the shattered panel pieces 100.

Figure 15:
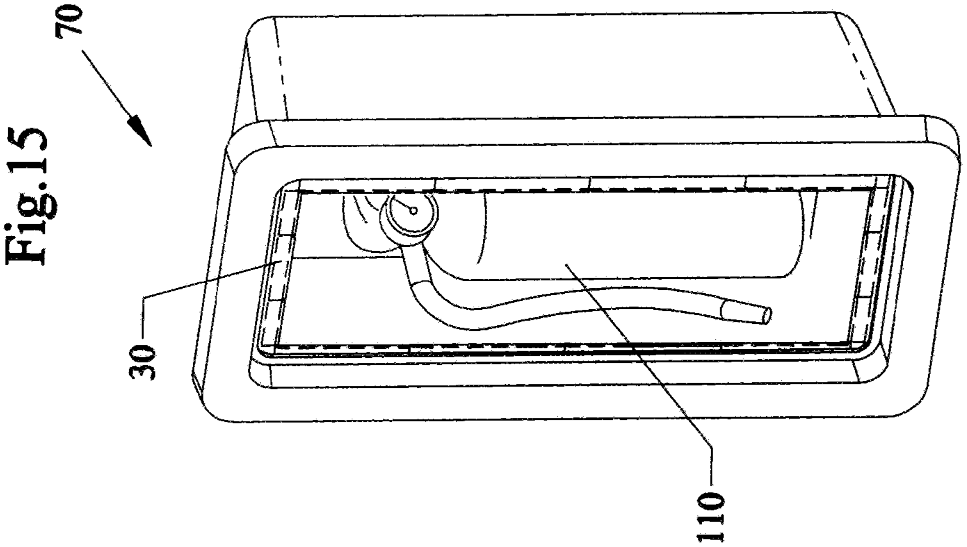
FIG. 15 is another perspective view of the small cabinet of FIG. 14 with the panel substantially broken out exposing a fire extinguisher.

FIG. 15 is another perspective view of the small cabinet of FIG. 14 with the panel 30 substantially broken out exposing a fire extinguisher 110. Here, the user can then retrieve the fire extinguisher 110 without being harmed by broken glass that is often used in the prior art.

Figure 16:
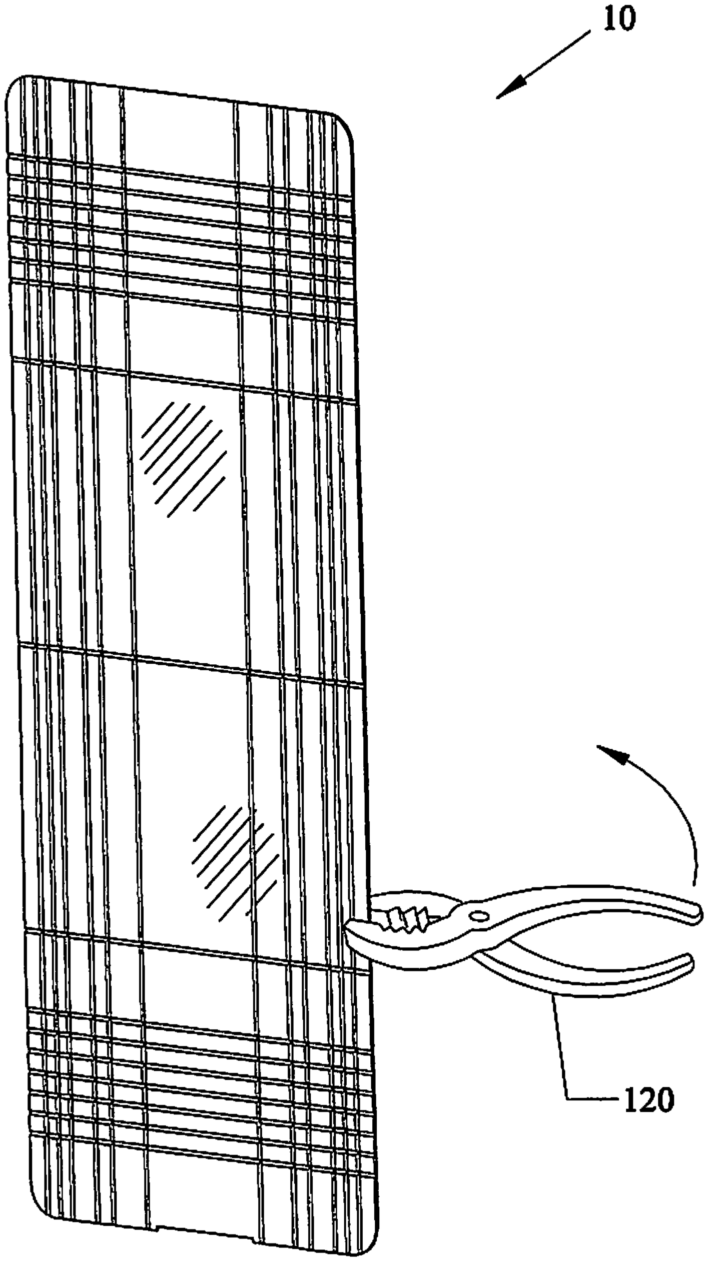
FIG. 16 is a perspective front view of the large breakaway panel of FIG. 1 with pliers being used to resize the panel as needed.

FIG. 16 is a perspective front view of the large breakaway panel 10 of FIG. 1 with pliers 120 being used to resize the panel 10 as needed. Although, pliers 120 are shown, a user can use other tools such as a needle-nose pliers, which makes breaking off the pieces extremely easy. In addition, the scored pieces can be broken off just using one's fingers. The installer such as a fire extinguisher technician can change out most glass panels in all fire extinguisher cabinets by only transporting three types of panels (large panel 10, mid-size panel 20 and small panel 30). The installer can then size the replacement panel by using any one of the three panels 10, 20, 30 or alternatively breaking off scored pieces to correctly size the respective panel to the respective cabinet. Again, unlike glass, the novel panels cannot cause harm to the installer or the ultimate user that breaks the breakaway panels to access the fire extinguisher.

Figure 17:
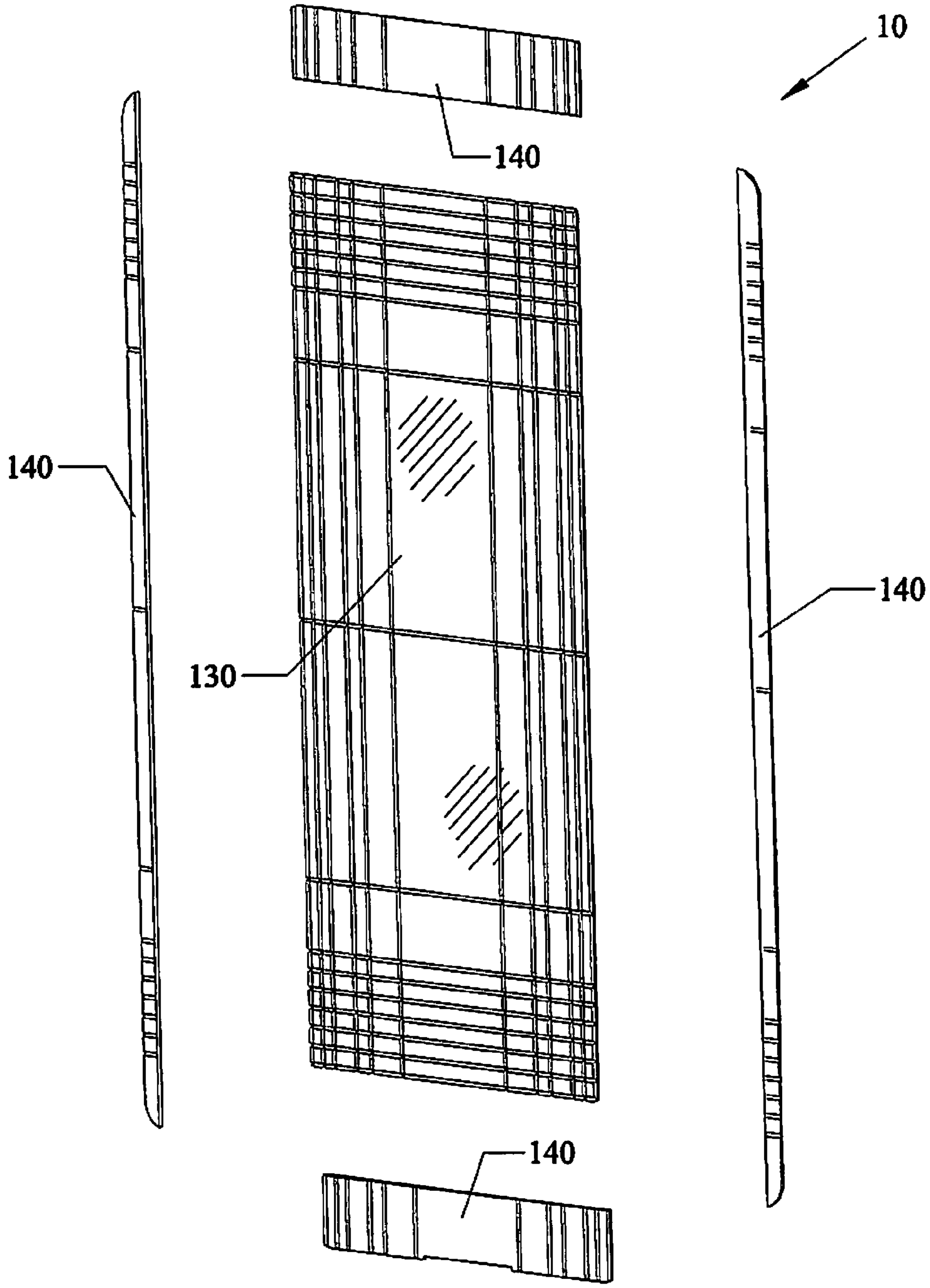
FIG. 17 is another perspective view of the large breakaway panel of FIG. 16 with top, bottom, left and right break away edges removed.

FIG. 17 is another perspective view of the large breakaway panel 10 of FIG. 16 with top, bottom, left and right break away edges 40 removed, so that a resized panel 130 is formed that can be used in a cabinet having an opening sized for the resized panel 130.

Injection Molded Panel

While the invention is described by scoring (routing) lines into the panels, both the scoring and the panel itself can be done by injection molding. So that the entire part can be formed from injection molding.

Figure 18:
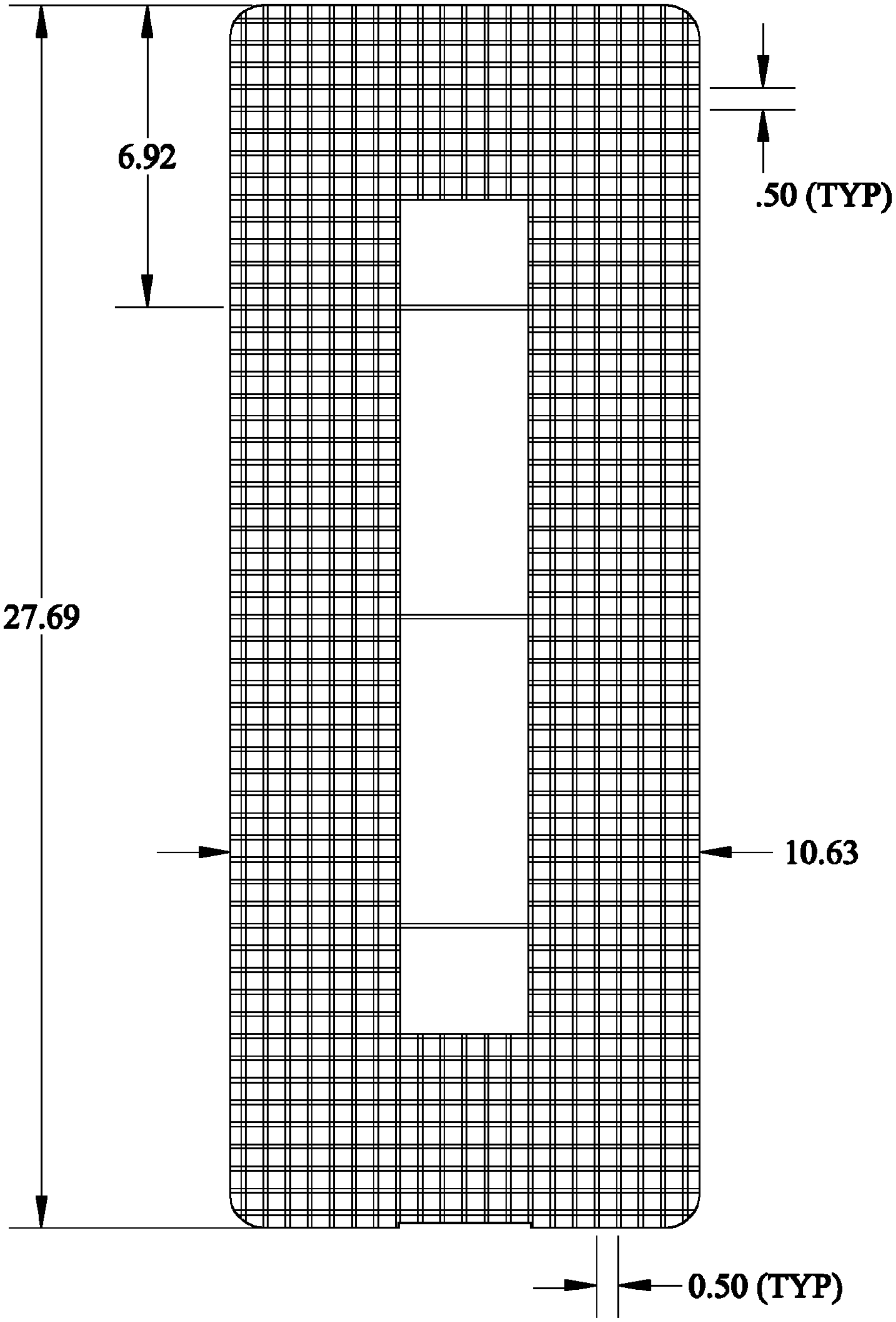
FIG. 18 is a perspective view of another embodiment of the breakaway panel that can be formed injection molding.

FIG. 18 is a perspective view of another embodiment of the breakaway panel that can be formed injection molding. This panel can have a width of approximately 10.63 inches and a length of approximately 27.69 inches. The panel can have four large rows that each have a height of approximately 6.92 inches. The panel can be formed with small square shaped scoring lines, with each square having a length and width of approximately 0.50 inches.

The panel can have a central rectangular section down the middle of the panel having large rectangular scored lines, wherein the large rectangular scored lines spaced substantially apart from the square shaped patterns of scored lines. The panel can have a perimeter small rectangular patterns of scored lines about each of the four sides of the panel, the small rectangular patterns being smaller than the square shaped patterns of scored lines.

With the injection molded panel, the depth of scoring from injection molding can be 0.050 inches which is deeper than scoring done by routing. The injection molded panels can have a thickness of 0.095 inches.

Additionally, the injection molded panel can be sized for small, mid sized and large breakaway panels.

The dimensions described in the patent application that are a preferred embodiment, and the label of "approximately" allows for a 10% (ten percent) deviation.

Although the invention references the panels for being used with fire extinguisher cabinets, the novel invention panels can be used for other types of cabinets, and the like.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A break away panel for fire extinguisher cabinets, comprising:

a planar translucent plastic break away panel having a single vertical column of large width scored sections down the middle of the panel between an upper edge and a lower edge, and a plurality of narrow width scored sections running down a left side and a plurality of narrow width scored sections running down a right side, wherein the large width sections are substantially larger in width than the narrow width sections, wherein the panel is used for fire extinguisher cabinets, wherein the translucent break away panel is breakable along portions of the scored sections by striking the panel, and the translucent breakable panel has a generally rectangular configuration for covering a front on a fire extinguisher cabinet.

2. The breakaway panel of claim 1, wherein the panel has a thickness of between approximately 0.080 inches and approximately 0.095 inches and the scored sections each have a depth of approximately 0.045 inches.

3. The breakaway panel of claim 1, wherein the panel has a thickness of between approximately 0.080 inches and approximately 0.095 inches and the scored sections each have a depth of approximately 0.050 inches.

4. The breakaway panel of claim 1, wherein the panel has dimensions of approximately 27.69 inches high by approximately 10.63 inches wide.

5. The breakaway panel of claim 4, wherein the panel includes four row scored sections each formed from scored lines spaced approximately 6.92 inches from one another, and the panel has three vertical columns of scored sections, each being formed from score lines spaced approximately 3.55 inches in width from one another.

6. The breakaway panel of claim 1, wherein the panel has dimensions of approximately 22.63 inches high by approximately 8.63 inches wide.

7. The breakaway panel of claim 6, wherein the panel includes four scored sections of rows each formed from scored lines spaced approximately 5.66 inches apart from one another, and the panel has three vertical columns of sections, each being formed from scored lines spaced approximately 2.88 inches in width.

8. The breakaway panel of claim 1, wherein the panel has dimensions of approximately 18.69 inches high by approximately 7.63 inches wide.

9. The breakaway panel of claim 8, wherein the panel includes four scored sections of rows each formed from scored lines spaced approximately 4.82 inches from one another, with a top row and bottom rows, and the panel has three vertical columns of scored sections, each being formed from scored lines spaced approximately 2.53 inches in width.

10. The break away panel of claim 1, wherein the scored sections are all formed on a rear side of the panel and an opposite unscored front of the panel is used as a striking surface for the striking of the panel.

11. The break away panel of claim 1, wherein the break away panel is a translucent plastic acrylic panel.

12. The break away panel of claim 1, further comprising:

a strike instruction label located on a centrally located section of the panel, wherein the strike instruction label does not overlay a scored line on the panel.

* * * * *